(12) United States Patent
Shiraiwa

(10) Patent No.: US 6,334,742 B1
(45) Date of Patent: Jan. 1, 2002

(54) PARTING/GROOVING INSERT SECURED BY FRICTION IN A HOLDER

(75) Inventor: Akio Shiraiwa, Waldwick, NJ (US)

(73) Assignee: Sandvik Inc., Fair Lawn, NJ (US)

( * ) Notice: Subject to any disclaimer, the term of this patent is extended or adjusted under 35 U.S.C. 154(b) by 0 days.

(21) Appl. No.: 09/514,289

(22) Filed: Feb. 28, 2000

(51) Int. Cl.[7] .......................... B23B 29/00; B23B 29/14
(52) U.S. Cl. .................. 407/110; 407/117; 407/107
(58) Field of Search .................. 407/110, 117, 407/107, 108, 109

(56) References Cited

U.S. PATENT DOCUMENTS

| | | | | |
|---|---|---|---|---|
| 1,131,538 A | * | 3/1915 | Mason | 407/83 |
| 2,453,959 A | * | 11/1948 | Anthony et al. | 407/96 |
| 4,801,224 A | | 1/1989 | Pettersson et al. | |
| 5,743,608 A | * | 4/1998 | Von Hass et al. | 407/19 |
| 5,803,675 A | | 9/1998 | Von Haas | |
| 5,836,723 A | * | 11/1998 | Von Hass et al. | 407/107 |
| 5,888,029 A | * | 3/1999 | Boianjiu | 407/66 |
| 5,931,613 A | * | 8/1999 | Larsson | 407/103 |
| 6,086,291 A | * | 7/2000 | Hansson et al. | 407/110 |
| 6,168,356 B1 | * | 1/2001 | Sjoo et al. | 407/104 |

FOREIGN PATENT DOCUMENTS

| | | |
|---|---|---|
| EP | 0 420 512 | 4/1991 |
| EP | 0 802 006 | 10/1997 |

* cited by examiner

*Primary Examiner*—Henry Tsai
(74) *Attorney, Agent, or Firm*—Burns, Doane, Swecker & Mathis, L.L.P.

(57) ABSTRACT

A parting/grooving insert formed of cemented carbide includes upper and lower surfaces of V-shaped cross-section adapted to mate with corresponding V-shaped walls of a holder. The walls form opposite sides of a slot in which the insert is frictionally held. One of the walls is formed on an elastically movable clamping arm of the holder which is elastically displaced away from the other wall when the insert is forced into the slot. Due to the elasticity of the clamping arm, the insert is frictionally secured. The upper and lower walls include recesses spaced apart by non-recessed portions of the respective surfaces of the insert which are engaged by the walls of the slot. Due to the presence of the recesses, the pressure acting on the non-recessed portions of the insert surfaces is increased.

5 Claims, 3 Drawing Sheets

PARTING/GROOVING INSERT SECURED BY FRICTION IN A HOLDER

BACKGROUND OF THE INVENTION

The present invention relates to a tool for chip removing machining, preferably for parting/grooving, comprising an insert mechanically clampable to a holder. The insert is arranged to be clamped in a slot in the holder by means of a spring-load that arises between the walls of the slot when the insert is pushed into the slot and produces a deflection of one of the slot walls. The invention further relates to an insert to be clamped in the holder.

Such a tool is disclosed in U.S. Pat. No. 4,801,224, the disclosure of which is incorporated by reference herein. That tool 10, depicted herein in FIGS. 1 and 2, comprises a holder 11 and an insert 12. The holder 11 has a rear end, not shown, adapted to be secured to a machine. The free front end of the holder is provided with a slot 13 defined by first and second opposing walls 14, 15 each having a generally V-shaped cross-section. The wall 14 comprises mutually angled planar wall sections 14a, 14b, and the wall 15 comprises mutually angled planar wall sections 15a, 15b. The upper portion of the holder which carries the wall 15 forms an integral cantilever-type clamping arm 16 arranged to clamp the insert between the walls of the slot by means of resilient force when the insert is pushed rearwardly into the slot. The angled wall sections of each wall 14, 15 converge toward the insert to form the V-shape. The wall sections of each wall meet in a rounded-off apex portion and enclose an internal obtuse angle. The front surface of the clamping arm 16 is comprised of a planar abutment surface 17 which determines the final position of the insert 12 in the slot.

The insert 12 is formed of sintered hard metal, such as cemented carbide, especially, tungsten carbide, and comprises a pair of longitudinally extending V-shaped first and second surfaces 21, 22. The first surface 21 extends parallel to the feed direction A of the tool. The second surface 22 comprises mutually inclined front and rear portions 23, 24, which together form an included obtuse angle. The rear portion 24 terminates rearwardly at a location separated from the first surface 21 by a rear face 20. The rear portion 24 converges toward the surface 21 and forms a wedge angle therewith. The surface 21 is configured to slide along the lower wall 14 of the slot, and the portions 23, 24 are configured to slide along the upper wall 15 of the slot. The sides of each surface 21, 22 meet in a central rounded-off portion (see FIG. 2) and form an external obtuse angle which is larger than the internal angle formed between corresponding portions at the holder. Contact occurs between the surface 21 and the wall 14 and between the front portion 23 and the wall 15 at each side of the midline M of the tool (FIG. 2) during the final phase of insertion.

The broader, front part of the insert body is provided with a cutting edge 25 arranged to part or to face a work piece, not shown. Furthermore, the insert is provided with parallel planar side faces 26, 27 and transversely directed front and rear end faces 28, 29. The front portion 23 of the surface 22 is generally parallel to the surface 21 in that it could be exactly parallel or slightly inclined such that it diverges from the surface 21 in a rearward direction.

During insertion of the insert 12 into the slot 16, the rear portion 24 of the surface 22 engages a front end 19 of the clamping arm 16 and elastically deflects the clamping arm away from the opposing portion of the holder. Eventually, the front end 19 engages the front portion 23 of the surface 22 and comes into contact with an abutment surface 30 of the insert. The insert 12 is now frictionally held between the walls 14 and 15 of the slot.

Although this frictional securement is usually adequate, it may occur on occasion that the insert becomes inadvertently dislodged from the holder.

It is, therefore, an object of the invention to increase the frictional forces that secure the insert in the holder.

SUMMARY OF THE INVENTION

The objects are achieved by a parting/grooving tool which comprises a holder and an insert removably secured in the holder. The insert includes front and rear ends. The front end contains a cutting edge, and the rear end includes a rear face. Upper and lower surfaces of the insert are of generally V-shaped cross-section and extend along a front-to-rear direction. The V-shape is bisected by a longitudinal midplane of the insert. The holder includes a forwardly opening slot formed by upper and lower front-to-rear extending walls of V-shaped cross-section. Each wall is defined by mutually angled wall sections. The walls face one another and engage the upper and lower surfaces, respectively, of the insert. The walls are elastically flexed apart to frictionally grip the upper and lower surfaces, respectively. At least one of the upper and lower surfaces is provided with recess patterns situated on respective sides of the longitudinal midplane. Each of the recess patterns is configured to define non-recessed portions of the at least one surface, the non-recessed portions being spaced apart along the front-to-rear direction. The wall sections of the holder which engages the at least one surface are planar and frictionally engage the non-recessed portions and extend across the recess patterns.

Preferably, both of the upper and lower surfaces possess the recess pattern and the non-recessed portions.

The invention also pertains to the parting/grooving insert per se.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
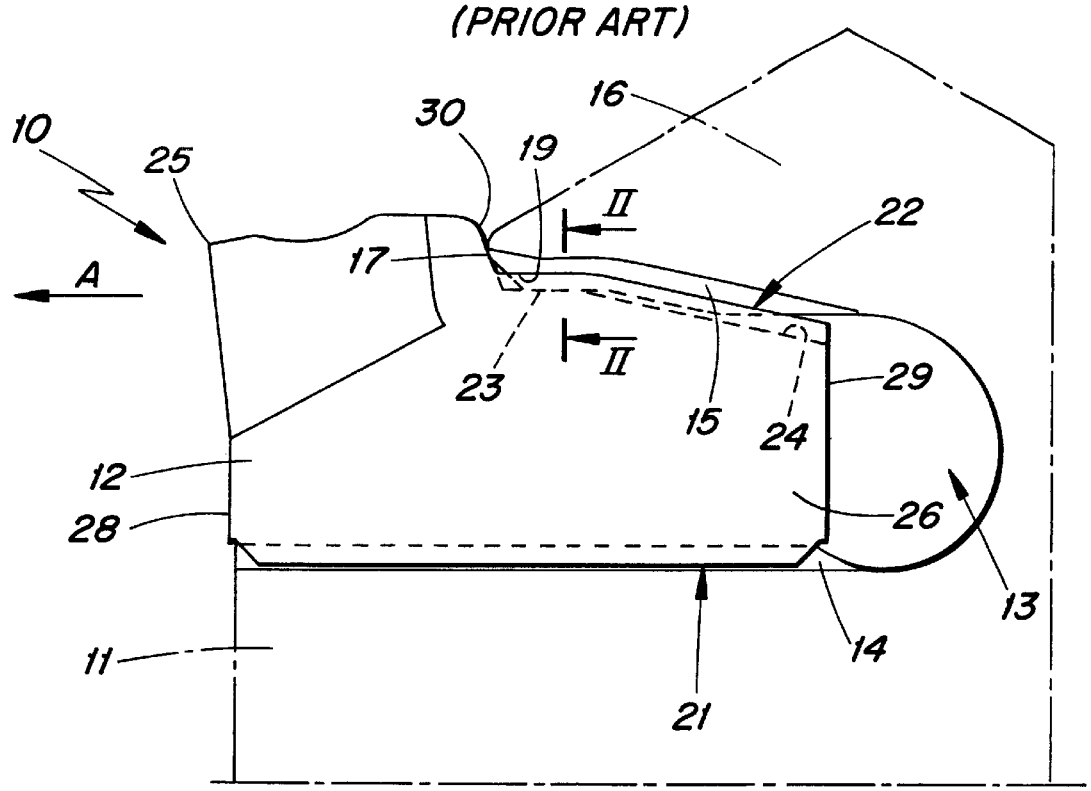
FIG. 1 is a side elevational view of a conventional parting/grooving insert mounted in a conventional holder.
Figure 2:
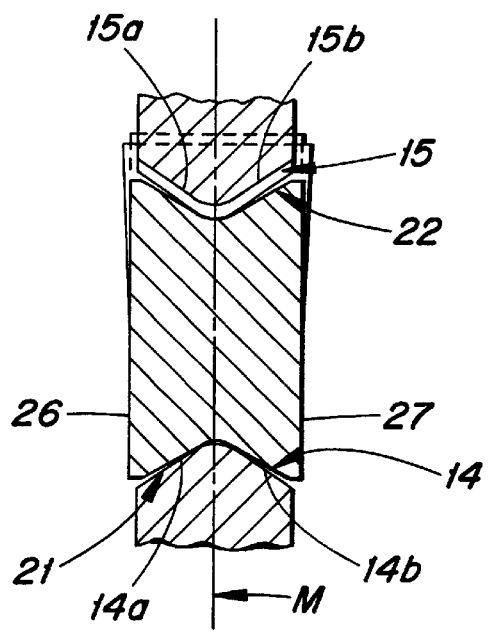
FIG. 2 is a sectional view taken along II-2 in FIG. 1.

Depicted in FIGS. 3–6 is a cutting insert 50 suitable for parting or grooving, and adapted to fit in the holder 11 of FIGS. 1, 2. The insert 50 is similar to the prior art insert disclosed in connection with FIGS. 1 and 2 in that the insert includes a body formed of a hard metal, such as cemented carbide, especially tungsten carbide, and includes a front face 52, a rear face 54, and a cutting edge 56 disposed at an upper portion of the front face. The insert also includes upper and lower surfaces 58, 60 each being of V-shaped cross-section and extending in a front-to-rear direction of the insert. Each of the V-shapes is bisected by a longitudinal center plane M of the insert.

The upper surface 58 includes front and rear portions 62, 64 angled relative to one another. That is, the rear portion 64 starts at the rear face 54 and extends forwardly at a progressively increasing distance from the lower surface 60. The front portion 62 extends forwardly from a front end of the rear portion 64 in a direction generally parallel to the lower surface 60 and terminates at a rearwardly facing abutment surface 66 of the insert situated rearwardly of the cutting edge.

The insert 50 differs from the previously described prior art insert in that each of the lower surface 60 and the front portion 62 of the upper surface includes recess patterns 68 situated on both sides of the mid plane M. Each recess pattern includes small recesses 68a which define therebetween non-recessed portions 70 of the surfaces 60, 62. The non-recessed portions 70 are spaced apart in the front-to-rear direction and make contact with the respective walls of the slot 13 of the holder.

As a result, the elastic clamping force applied by the holder to the insert is divided over a smaller surface area (due to the presence of the recess pattern 68), whereby the clamping pressure (pounds per square inch) generated by the clamping force is increased, to more securely retain the insert.

The walls 14, 15 of the holder are planar and thus relatively smooth, i.e., those walls do not extend into the recesses 68a so as to create an interference type of connection. (During a cutting operation it is possible that the forces applied to the insert could cause the recess pattern to be indented slightly into the planar wall sections 14a,b or 15a,b of the holder slot 13, but not enough to prevent the insert from later being pushed out of the slot.)

The recesses 68a can be of any suitable size. For example each recess could have a width W of 0.002 to 0.02 inches in the front-to-rear direction, a preferred spacing S in the front-to-rear direction of 0.01–0.05 inch (the spacing S defining the width of each non-recessed portion 70), and a preferred depth D of 0.0005–0.001 inches, depending on the insert size.

Figure 3:
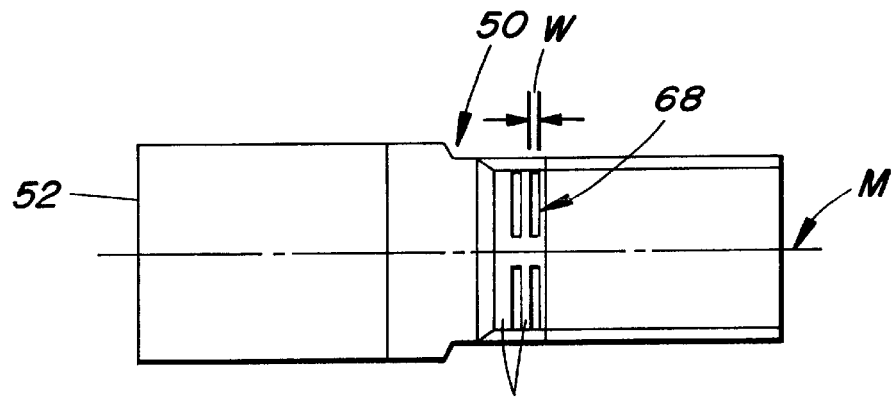
FIG. 3 is a top plan view of a parting/grooving insert according to the present invention.
Figure 4:
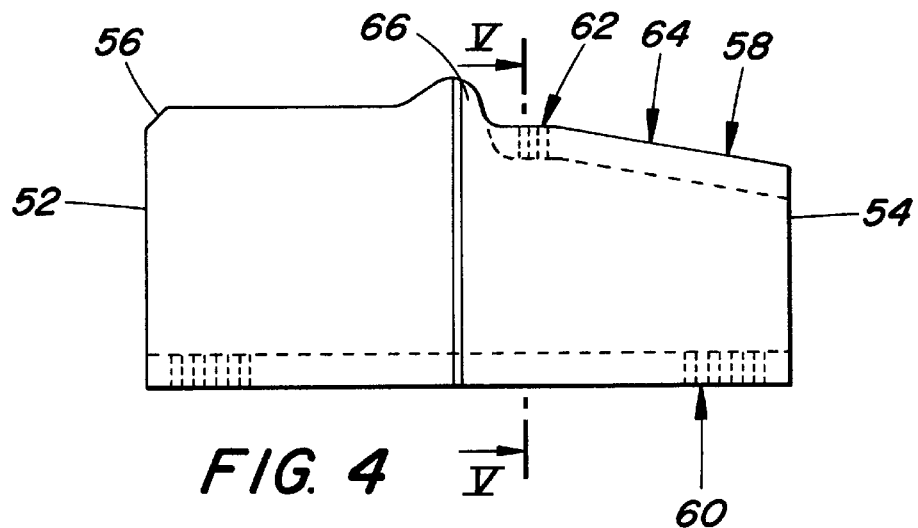
FIG. 4 is a side elevational view of the insert depicted in FIG. 3.
Figure 5:
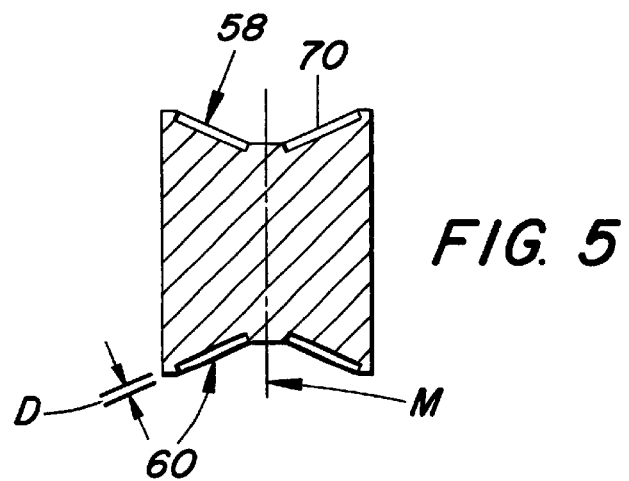
FIG. 5 is a cross-sectional view taken along the line V—V in FIG. 4.
Figure 6:
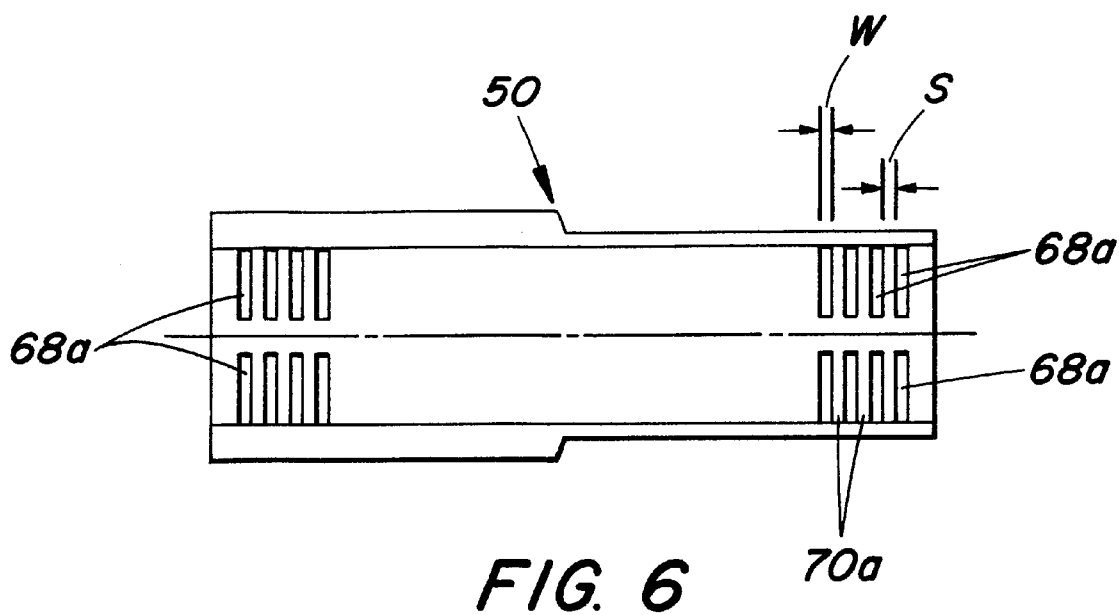
FIG. 6 is a bottom view of the insert depicted in FIG. 3.

Alternate forms of recess patterns are possible. For example, the recesses need not extend perpendicular to the center plane M as shown in FIGS. 3 and 6, but rather could be inclined at oblique angles (e.g. 10°) relative to the longitudinal center plane M.

Figure 7:
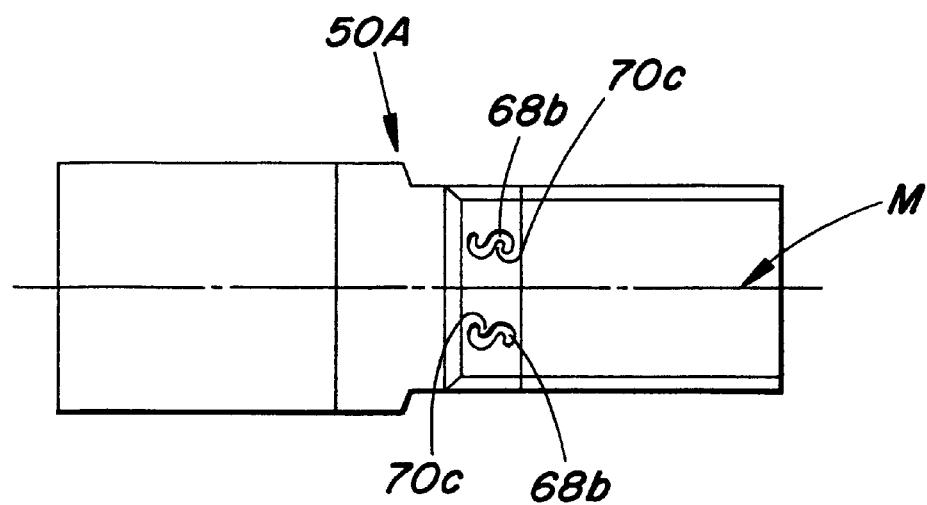
FIG. 7 is a top view of another parting/grooving tool according to the present invention.

The recess pattern could comprise a wave-shaped microrecess as shown at 68b in FIG. 7, thereby forming non-recessed portions 70C spaced by successive portions of the wave.

The recess pattern could comprise any suitable shape, such as circular or elliptical recesses, for example, which create non-recessed portions.

In summary, due to the presence of the recess pattern, the clamping pressure is increased since the overall area of the surfaces 58, 60 is reduced. This tends to prevent accidental dislodgement of the insert.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A chip removing cutting tool comprising a holder and an insert removably secured in said holder,
    said insert including front and rear ends, said front end containing a cutting edge, said rear end including a rear face, upper and lower surfaces of said insert being of generally V-shaped cross-section and extending along a front-to-rear direction, said V-shape being bisected by a longitudinal midplane of said insert, said holder including:
    a forwardly opening slot formed by upper and lower front-to-rear extending walls of V-shaped cross-section, each wall defined by mutually angled planar wall sections, said walls facing one another and engaging said upper and lower surfaces, respectively, and being elastically flexed apart thereby, to frictionally grip said upper and lower surfaces, respectively;
    at least one of said upper and lower surfaces being provided with first and second recess patterns extending thereinto and situated on respective sides of the longitudinal midplane, said first and second recess patterns being spaced from one another, each recess pattern comprising recesses spaced apart in said front-to-rear direction, wherein adjacent pairs of said recesses define non-recessed portions therebetween, said non-recessed portions being spaced apart along said front-to-rear direction each of said recesses having a width in said front-to-rear direction in a range of substantially 0.002 to substantially 0.02 inches, and said adjacent recesses being spaced apart by a distance in a range of substantially 0.01 to substantially 0.05 inches;
    said planar wall sections of said holder slot functionally engaging said non-recessed portions and extending across said recess patterns.

2. The tool according to claim 1 wherein both of said upper and lower surfaces possess said recess patterns and said non-recessed portions.

3. The tool according to claim 1 wherein said upper surface includes front and rear portions, said rear portion starting from said rear face and extending forwardly at a progressively increasing distance from said lower surface, said front portion extending forwardly from a front end of said rear portion in a direction generally parallel to said lower surface and terminating at a rearwardly facing abutment surface of said insert, each of said lower surface and said front portion of said upper surface possessing said recess patterns.

4. A chip removing cutting insert comprising a body formed of cemented carbide and including front and rear ends, upper and lower surfaces of said insert being of V-shaped cross-section and extending along a front-to-rear direction, said V-shapes being bisected by a longitudinal midplane of said insert, said upper surface including front and rear portions, said rear portion starting from a rear end of said insert and extending forwardly at a progressively increasing distance from said bottom surface, said front portion extending forwardly from a front end of said rear portion in a direction generally parallel to said bottom surface and terminating at a rearwardly facing abutment surface of said insert, at least one of said lower surface and said front portion of said upper surface including recess patterns situated on respective sides of said longitudinal midplane, said first and second recess patterns being spaced from one another, each recess pattern comprising recesses spaced apart in said front-to-rear direction, wherein adjacent pairs of said recesses define non-recessed portions therebetween, said non-recessed portions being spaced apart in said front-to-rear direction, each of said recesses having a width in said front-to-rear direction in a range of substantially 0.002 to substantially 0.02 inches, and said adjacent recesses being spaced apart in said front-to-rear direction by a distance in a range of substantially 0.01 to substantially 0.05 inches.

5. The insert according to claim 4 wherein each recess pattern comprises recesses spaced apart in said front-to-rear direction, each recess having a width in said front-to-rear direction in the range of 0.002 to 0.02 inches.

\* \* \* \* \*